No. 702,015. Patented June 10, 1902.
J. H. LUBBERS.
GLASS DRAWING APPARATUS.
(Application filed Jan. 8, 1901.)
(No Model.)

WITNESSES

INVENTOR
John H. Lubbers
by Bakewell & Bakewell
his attorneys.

UNITED STATES PATENT OFFICE.

JOHN H. LUBBERS, OF NEW KENSINGTON, PENNSYLVANIA, ASSIGNOR, BY DIRECT AND MESNE ASSIGNMENTS, TO JAMES A. CHAMBERS, TRUSTEE, OF PITTSBURG, PENNSYLVANIA.

GLASS-DRAWING APPARATUS.

SPECIFICATION forming part of Letters Patent No. 702,015, dated June 10, 1902.

Application filed January 8, 1901. Serial No. 42,520. (No model.)

*To all whom it may concern:*

Be it known that I, JOHN H. LUBBERS, of New Kensington, in the county of Westmoreland and State of Pennsylvania, have invented a new and useful Glass-Drawing Apparatus, of which the following is a full, clear, and exact description, reference being had to the accompanying drawings, forming part of this specification, in which—

Figure 1:
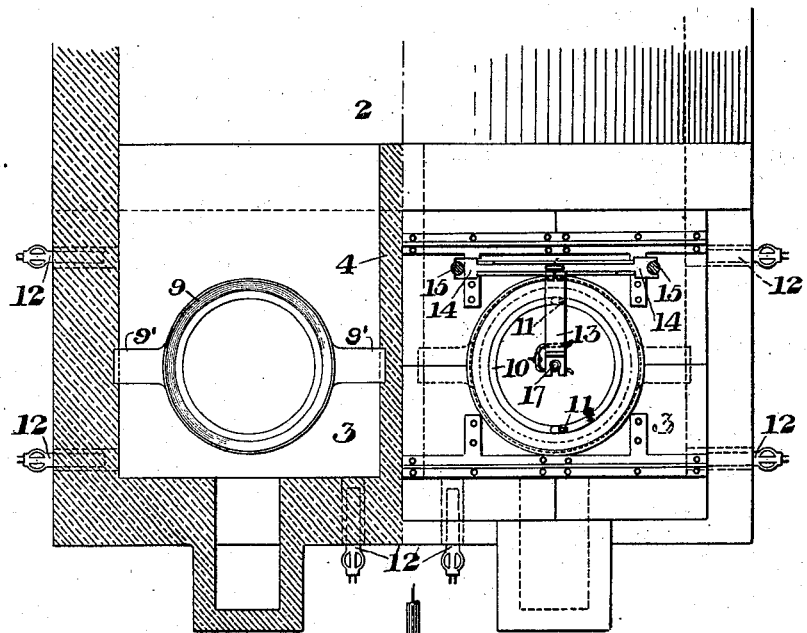
Figure 2:
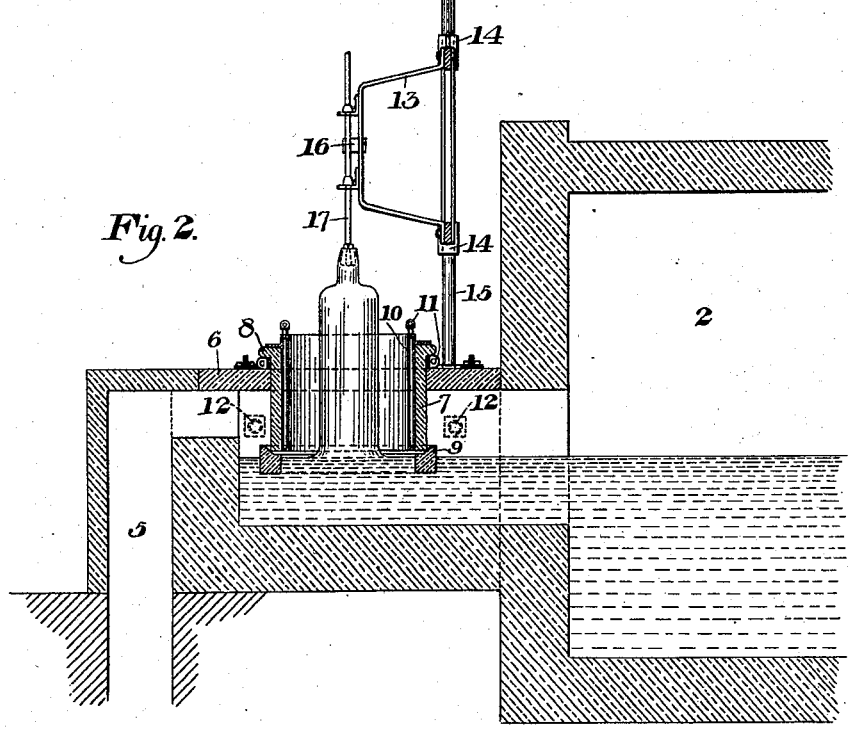

Figure 1 is a top plan view, partly broken away, of apparatus constructed in accordance with my invention; and Fig. 2 is a sectional side elevation of the same.

My invention relates to apparatus for drawing glass articles; and its object is to improve such apparatus and prevent distortion of the article and chilling of the main bath, while preventing any surrounding heat from reaching the article at the drawing-point.

In the drawings, 2 represents a glass-tank furnace having an extension or forehearth, which, as shown in the drawings, may be divided into two or more forehearths or receptacles 3 3 by means of a vertical partition 4. Each of these forehearths is provided with an offtake-flue 5, through which the heat and gases from the main tank pass to the stack-flue.

In the roof 6 of each forehearth is provided an opening, which is preferably circular, as the apparatus is shown as adapted for drawing cylinders. Within this opening fits a depending shield 7, having an upper lateral flange 8, which is carried on the roof of the extension. The lower end of this refractory shield rests upon the inwardly-beveled upper face of a floating refractory ring 9, having guiding-arms 9' within recesses of the side walls. This ring 9 floats upon the glass, which rests at the same level in the forehearth as in the tank proper, and a sealing-joint is thus afforded which practically excludes the surrounding heat from the surface of the glass within the ring.

Within the refractory shield fits a water-cooled ring 10, having a lateral supporting-flange, which rests upon the top of the refractory shield. Water inlet and outlet pipes are connected to the cooling-ring, and both the ring and the shield are preferably provided with eyes or similar devices 11, by which the parts may be adjusted and lifted from and lowered into place.

In each forehearth I show burners 12, projecting into them above the level of the glass. The temperature of the glass in the forehearth may thus be controlled to give the proper results in the drawing operation, and I believe it to be new to draw a glass article from a body of glass contained in such forehearth or extension in which the glass is subjected to heat derived either from the main tank or from a separate source of heat or from both.

I have shown the drawing apparatus proper as comprising a frame 13, having slides 14, which move upon vertical supports or rods 15. The frame is provided with a pipe-clamp 16, by which a blowpipe 17 is detachably secured to the vertically-movable frame; but this part of the apparatus may be changed without departing from my invention.

In the operation of the apparatus the shield, the water-cooled ring, and the floating ring are arranged in the manner shown in Fig. 2, and the pipe upon the frame is lowered into the bath of glass within the cooling device. The frame is then drawn upwardly and a neck portion of the article is formed, and additional air then being supplied the sides of the hollow article are swelled out to the desired size. The cross-head is then given a continuous and uniform upward movement, and the air is continuously supplied to the interior in such a manner as to form the article into the desired shape. When the cylinder has been drawn the desired length, the lifting apparatus may be stopped and the lower end of the cylinder detached from the glass of the bath. The article then being removed, the frame may be lowered, another pipe secured upon it, and the operation repeated.

I derive important advantages from the peculiar arrangement of the refractory shield and the water-cooled ring, together with the floating ring, and, further, from the use of the heating-flues, which take their heat from the main tank. The refractory shield protects the water-cooled ring and also prevents chilling of the bath where it is not desired. The chilling action is restricted to the point desired, and as the flame and heat are kept away from the surface of the bath at the drawing-point a uniform article is obtained. Parts of my apparatus may be used for drawing sheets or solid articles, and changes may be made in the form and arrangement of the drawing-frame, the shields, and the other parts without departing from my invention.

I claim—

1. In glass-drawing apparatus, a ring arranged to float upon a glass-bath, and a shield device arranged to form a sealing-joint with said ring above the level of the bath; substantially as described.

2. In glass-drawing apparatus, a float of refractory material, and a depending shield forming a sealing-joint therewith above the level of the glass; substantially as described.

3. In glass-drawing apparatus, a water cooling device, a refractory shield therefor, and a float with which the shield contacts; substantially as described.

4. In glass-drawing apparatus, an annular water-cooled ring, an annular refractory shield surrounding the same, and a floating ring with which the shield contacts; substantially as described.

5. In glass-drawing apparatus, a floating ring having holding devices for retaining it in proper position, a shield arranged to form a sealing-joint with the ring, and glass-drawing apparatus arranged to operate within the shielding device; substantially as described.

6. In glass-drawing apparatus, a float, means for holding it in the desired position, a shielding device coacting with the float, and glass-drawing apparatus arranged to act upon the glass shielded by said parts; substantially as described.

In testimony whereof I have hereunto set my hand.

JOHN H. LUBBERS.

Witnesses:
H. M. CORWIN,
G. I. HOLDSHIP.